No. 641,773. Patented Jan. 23, 1900.
H. HOESCHEN.
CENTRIFUGAL MACHINE.
(Application filed May 13, 1899.)
(No Model.)
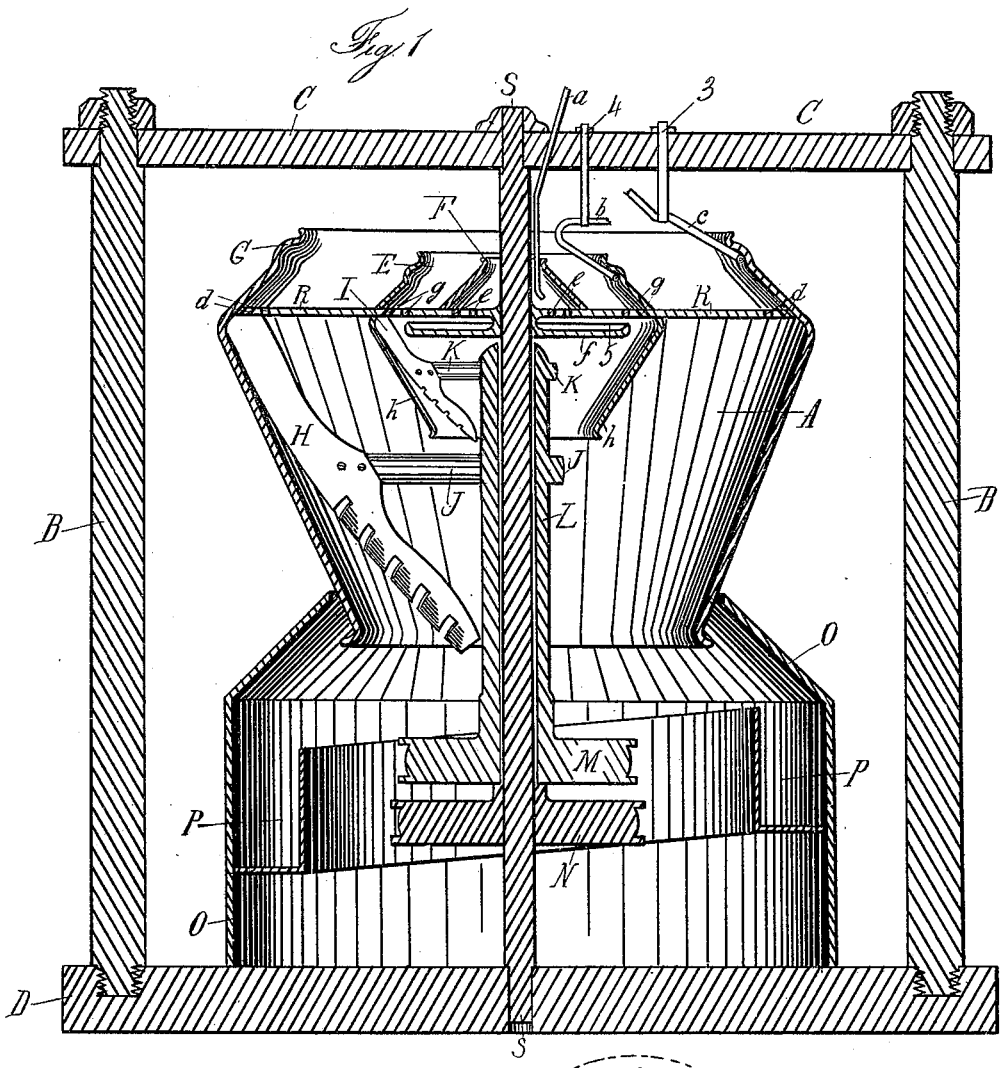
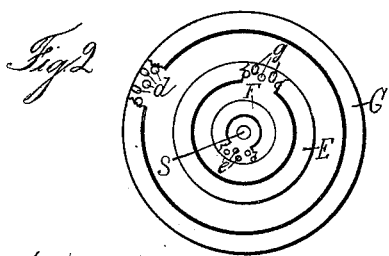
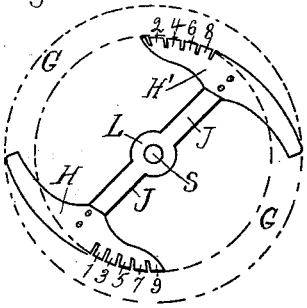
WITNESSES
C. F. Patterson
W. A. Dodsworth
INVENTOR
Henry Hoeschen
G. W. Sues
PER
ATTORNEY

UNITED STATES PATENT OFFICE.

HENRY HOESCHEN, OF OMAHA, NEBRASKA.

CENTRIFUGAL MACHINE.

SPECIFICATION forming part of Letters Patent No. 641,773, dated January 23, 1900.

Application filed May 13, 1899. Serial No. 716,739. (No model.)

*To all whom it may concern:*

Be it known that I, HENRY HOESCHEN, residing at Omaha, in the county of Douglas and State of Nebraska, have invented certain useful Improvements in Centrifugals; and I do hereby declare that the following is a full, clear, and exact description of the invention, such as will enable others skilled in the art to which it appertains to make and use the same, reference being had to the accompanying drawings, which form a part of this specification.

This invention relates to an improvement in centrifugals.

The object of my invention is to provide a centrifugal machine, by means of which fluids of various weights and densities may be separated and by means of which solids and suspensions in liquids may be removed.

In the accompanying drawings I have shown in Figure 1 a centrifugal machine embodying my invention, with portions broken away. Fig. 2 shows a top view of the centrifugal proper, while Fig. 3 shows the position of the scoops used in agitating the material as it clings to the pan.

My invention embodies, essentially, suitable supporting-frame comprising the bottom D and the bars B and C. Extending from the bottom D and working within the upper bar C is a shaft S, and this shaft S is provided below with a suitable pulley N, adapted to receive a belt to drive the same. Secured to this shaft S is the centrifugal proper, comprising an open-ended pan in the shape of two truncated cones united at their bases by means of the diaphragm R, as is clearly shown in Fig. 2. It will be noted, however, that this diaphragm is not exactly midway between the two cone-sections, but extends upward a suitable distance, so that the lower portion or division of the centrifugal is provided with a portion bulging outward from the bottom, as will be understood in referring to the drawings. This diaphragm R is provided centrally with a plurality of openings $e$ and $g$, and has secured to it the upwardly-extending and inclined flanges E and F, which flanges are in the form of rings, as is shown in Fig. 2, below which are positioned the openings $e$ and $g$. Extending from this diaphragm R is further a disk $f$, provided with an upwardly-extending edge 5. This disk does not extend quite beyond the outer series of openings $g$. A downwardly-extending open-ended hood is further positioned or secured to this diaphragm R and entirely encompasses all of the openings $e$ within the upper diaphragm and the openings $g$. This diaphragm R is further provided with a plurality of openings $d$ near its outer edge, as is shown in Figs. 1 and 2. From this it will be seen that my centrifugal proper comprises an open-ended bulging pan, the openings of which are of a diameter less than the greatest diameter of the pan and which near the bulging portion is provided with a perforated diaphragm, which perforations are disposed in rings, each separate system of perforations being surrounded above by an upwardly-extending flange, while extending from the diaphragm downward is a disk in the form of a table which is surrounded by a suitable hood.

Surrounding the shaft S and resting upon the pulley M is a sleeve L, from which sleeve L extend two arms, one of them being removed to show the proper construction in Fig. 1, while both arms are shown in Fig. 3. These arms J are provided with scoops H H', which are adapted to work against the inner surface of the lower section of my centrifugal and embody the upper scooping-blade H H' proper and a series of lower blade-sections 1 2 3 4, &c., which are divided by suitable openings. These scoops may be plow-shaped, so that the material may be turned over. These larger scoops H H' work within the lower portion of the centrifugal and, it will also be noticed, come in contact with the bottom of the diaphragm R immediately below the opening $d$, as is shown. These scoops H H' are revolved by the sleeve L. Extending from the sleeve L is a second system of scoops I, identical in construction with the scoops H H', but simply smaller, which work within the hood $h$, touching the top of the diaphragm R immediately below the openings $g$, so that any material clinging within the lower portion of the centrifugal or within the hood H will be agitated and finally removed by means of these scoops H and I.

Entering the inner ring division F of my centrifugal from above is an ordinary supply-pipe $a$, through which the oil, water, or mineral substances to be filtered or separated escape. Near the upper edge of the ring-sections formed by means of the ring E and the upper edge G of my centrifugal proper are the two escape-pipes $b$ and $c$, which are held by means of suitable supports 3 and 4.

Surrounding the lower open end of my centrifugal A is a suitable casing O, within which casing is a chamber P, preferably sloping, into which material empties that escapes out of the lower open end of my centrifugal proper.

The operation of my device would be as follows: The shaft S and sleeve L are revolved, preferably, in the same directions at very high, but variable, speeds, so that while the centrifugal A is revolved at a very high speed the scoops H and I follow the same at a preferably reduced speed. If desired, the scoops may be revolved at a higher speed than the centrifugal. The material to be separated enters the centrifugal, while the same is in motion, through the pipe $a$. It is then deposited upon the perforated diaphragm within the ring F. Here the heavier particles gravitate outward, partly finding an exit downward through the openings $e$, while the lighter material washes upward over the ring F into the second annular compartment, formed by means of the ring E, where the material is again separated, the lighter material at the same time working inward and upward until it escapes over the upper edge of the ring E, while the heavier particles again gravitate outward to escape through the openings $g$. All of the heavier material that gravitates through the openings $e$ is deflected from the table $f$, while also a part of the heavier particles collected within the annular compartment formed by the ring E is also deflected from this table $f$. The remainder is whirled outward, lodging against the inner surface of the hood $h$. The lighter material as the centrifugal revolved would find an escape through the pipe $b$, while what did not escape through this pipe would gradually wash over the ring E and enter the third chamber formed by means of the shell or casing G of the centrifugal proper. Here the lighter stuff would be again whirled inward and upward, while the heavier would again gravitate outward, escaping through the openings $d$ and emptying through the pipe $c$, up which the material would be shot as the centrifugal rotates toward the open ends of these tubes $b$ and $c$. The heavier particles working through the perforations $g$ and $e$ and over the recurved edge of the table $f$ would strike against the hood $h$ and impinge themselves against this hood to remain stationary and revolve with this hood if it were not for the scoops I, which follow the hood H, and remove the collected material from the hood in the manner of a plow in that the material is successively turned over, and as the scoops are curved downward, as will be noticed in referring to Fig. 3, the material is gradually fed toward the lower end of the hood H to empty through the same by means of these scoops I. This is also true in relation to the material that escaped through the openings $d$, which would also lodge against the centrifugal, and a greater portion thereof would most likely cling to the same if it were not removed by means of the scoops H H'. In order not to remove this material too rapidly, I divide the scoops near the lower ends, as is shown in Fig. 3, into different sections, so that what would escape being agitated between the openings—say 1 and 3—will be removed by the projections 8 upon the opposite side, while the material that would not be removed because of the opening between the portions 5 and 7 would be removed by the portion 5 of the blade opposite. In this way the material is thoroughly worked to permit a fine separation. From this it will be seen that my centrifugal is so arranged that the lighter substances are successively treated within the upper portion of my centrifugal, the heavier moving outward and downward and finally escaping out of the lower end of the centrifugal.

By this arrangement of instrumentalities I find that drinking-water such as is taken from murky rivers can be nicely clarified in that the crystal pure water may finally be drawn off through the tube $c$, while the sediment is removed by means of the scoops H H' through the lower end. So, also, heavier oil may be separated from the lighter, as can also solids in suspension in fluids.

Having thus described my said invention, what I claim as new, and desire to secure by United States Letters Patent, is—

1. The combination with an open-ended centrifugal provided with a perforated diaphragm dividing said centrifugal into an upper and a lower section, of an exit-duct entering the upper section of said centrifugal, and a scoop within the lower portion of said centrifugal supported independently of said centrifugal.

2. The combination with an open-ended centrifugal, provided with an enlargement intermediate of its ends and having a perforated diaphragm positioned within said enlargement, of an exit-duct entering one end of said centrifugal, and a revolving scoop within the remaining end of said centrifugal.

3. The combination with an open-ended centrifugal provided with an enlargement intermediate of its open ends and having a diaphragm positioned within said enlargement, said diaphragm having a plurality of openings disposed in series within said diaphragm, of a flange extending outward from said diaphragm to divide said diaphragm into a series of concentric annular chambers, a supply-pipe entering the innermost of said annular chambers, and exit-pipes extending from said remaining annular chambers.

4. The combination with an open-ended centrifugal provided with an intermediate enlargement, of a diaphragm within said enlargement, provided with a plurality of openings disposed in series within said diaphragm, a plurality of upwardly-extending flanges surrounding said perforations to provide a series of concentric annular compartments, a supply-pipe entering one of said compartments, exit-pipes extending from the remaining compartments a table positioned below said perforations and secured to said diaphragm, and a scraper revolving within the lower portion of said centrifugal.

5. An open-ended centrifugal provided with an intermediate enlargement, and having a perforated diaphragm within said enlargement, a plurality of upwardly-extending flanges surrounding said openings to form a series of annular compartments, a table below said perforated diaphragm and revolving with the same, a hood surrounding said table, a scraper revolving within said hood, and a scoop working within the lower portion of said centrifugal, all arranged substantially as and for the purpose set forth.

6. The combination with an open-ended centrifugal, having a perforated diaphragm positioned intermediate of said ends, of an exit-duct entering one end of said centrifugal, an intake-pipe entering said centrifugal, and a plurality of revolving plow-shaped scoops, within the remaining end of said centrifugal.

HENRY HOESCHEN.

In presence of—
GEORGE W. SUES,
MABEL A. DODSWORTH.